(12) United States Patent
Giroud et al.

(10) Patent No.: US 11,071,932 B2
(45) Date of Patent: Jul. 27, 2021

(54) FILTER AND A METHOD FOR CHECKING THE SUITABILITY OF A FILTER ELEMENT

(71) Applicant: VOLVO TRUCK CORPORATION, Gothenburg (SE)

(72) Inventors: François Giroud, Lyons (FR); Baptiste Boutin, La Tour du Pin (FR); Thomas Grange, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 315 days.

(21) Appl. No.: 16/075,594

(22) PCT Filed: Feb. 8, 2016

(86) PCT No.: PCT/IB2016/000271
§ 371 (c)(1),
(2) Date: Aug. 4, 2018

(87) PCT Pub. No.: WO2017/137790
PCT Pub. Date: Aug. 17, 2017

(65) Prior Publication Data
US 2019/0070537 A1 Mar. 7, 2019

(51) Int. Cl.
*B01D 37/04* (2006.01)
*B01D 29/60* (2006.01)
(Continued)

(52) U.S. Cl.
CPC ........... *B01D 37/046* (2013.01); *B01D 29/33* (2013.01); *B01D 29/606* (2013.01); *B01D 35/14* (2013.01);
(Continued)

(58) Field of Classification Search
CPC ...... B01D 37/046; B01D 37/04; B01D 29/33; B01D 29/606; B01D 29/60; B01D 35/14;
(Continued)

(56) References Cited

U.S. PATENT DOCUMENTS

2003/0178351 A1* 9/2003 Doyle .................... B01D 29/58
210/131
2006/0060512 A1* 3/2006 Astle .................... B01D 29/606
210/85

FOREIGN PATENT DOCUMENTS

| CN | 2367335 Y | 3/2000 |
| CN | 1540156 A | 10/2004 |

(Continued)

OTHER PUBLICATIONS

DE 10 2005 058109 A1 English description, Jun. 2007, Manns Dieter.*

(Continued)

*Primary Examiner* — Robert Clemente
*Assistant Examiner* — Akash K Varma
(74) *Attorney, Agent, or Firm* — Venable LLP; Jeffri A. Kaminski

(57) ABSTRACT

A filter element is provided and includes a filter medium having an axial channel, end plates each sealingly covering one axial end of the filter medium, one end plate having an opening in fluid communication with the channel, a hole arranged on the liquid path, not on the filter medium, and a closing member which is arranged in the hole and which is configured: to prevent liquid from flowing through the hole when the liquid pressure upstream the closing member is below a predetermined threshold to open at the threshold, to allow liquid to flow through the hole, and, after it has been opened, to remain open. A method is provided for checking the suitability of a filter element, at first use after a filter element change. The method includes monitoring the liquid pressure at a point of the liquid circuit located outside of and near a port of a filter housing receiving the filter element, when an electrical pump of the liquid circuit is restarted for the first time, comparing the evolution of the monitored (Continued)

liquid pressure over time with a predetermined evolution over time of the liquid pressure at the point for a new reference filter element.

19 Claims, 4 Drawing Sheets

(51) Int. Cl.
| | |
|---|---|
| *B01D 35/153* | (2006.01) |
| *B01D 35/26* | (2006.01) |
| *B01D 35/143* | (2006.01) |
| *B01D 29/33* | (2006.01) |
| *F01M 11/03* | (2006.01) |
| *F01M 11/10* | (2006.01) |
| *F02M 37/22* | (2019.01) |
| *B01D 35/14* | (2006.01) |

(52) U.S. Cl.
CPC ......... *B01D 35/143* (2013.01); *B01D 35/153* (2013.01); *B01D 35/26* (2013.01); *F01M 11/03* (2013.01); *F01M 11/10* (2013.01); *F02M 37/22* (2013.01); *B01D 2201/291* (2013.01); *B01D 2201/295* (2013.01); *B01D 2201/4046* (2013.01); *F01M 2011/035* (2013.01)

(58) Field of Classification Search
CPC .... B01D 35/143; B01D 35/153; B01D 35/26; B01D 35/147; B01D 2201/291; B01D 2201/295; B01D 2201/4046; B01D 27/10; F01M 11/03; F01M 11/10; F01M 2011/035; F02M 37/22; F16H 57/04; F16H 57/0404; F16N 39/06
USPC .......................................................... 210/741
See application file for complete search history.

(56) References Cited

FOREIGN PATENT DOCUMENTS

| | | | |
|---|---|---|---|
| CN | 101084050 A | 12/2007 | |
| DE | 102005058109 A1 * | 6/2007 | ............. B01D 27/10 |
| DE | 102005058109 A1 | 6/2007 | |

OTHER PUBLICATIONS

International Search Report (dated Nov. 16, 2016) for corresponding International App. PCT/IB2016/000271.
China Office Action dated Aug. 18, 2020 in corresponding China Patent Application No. 201680081251.4. 14 pages.

* cited by examiner

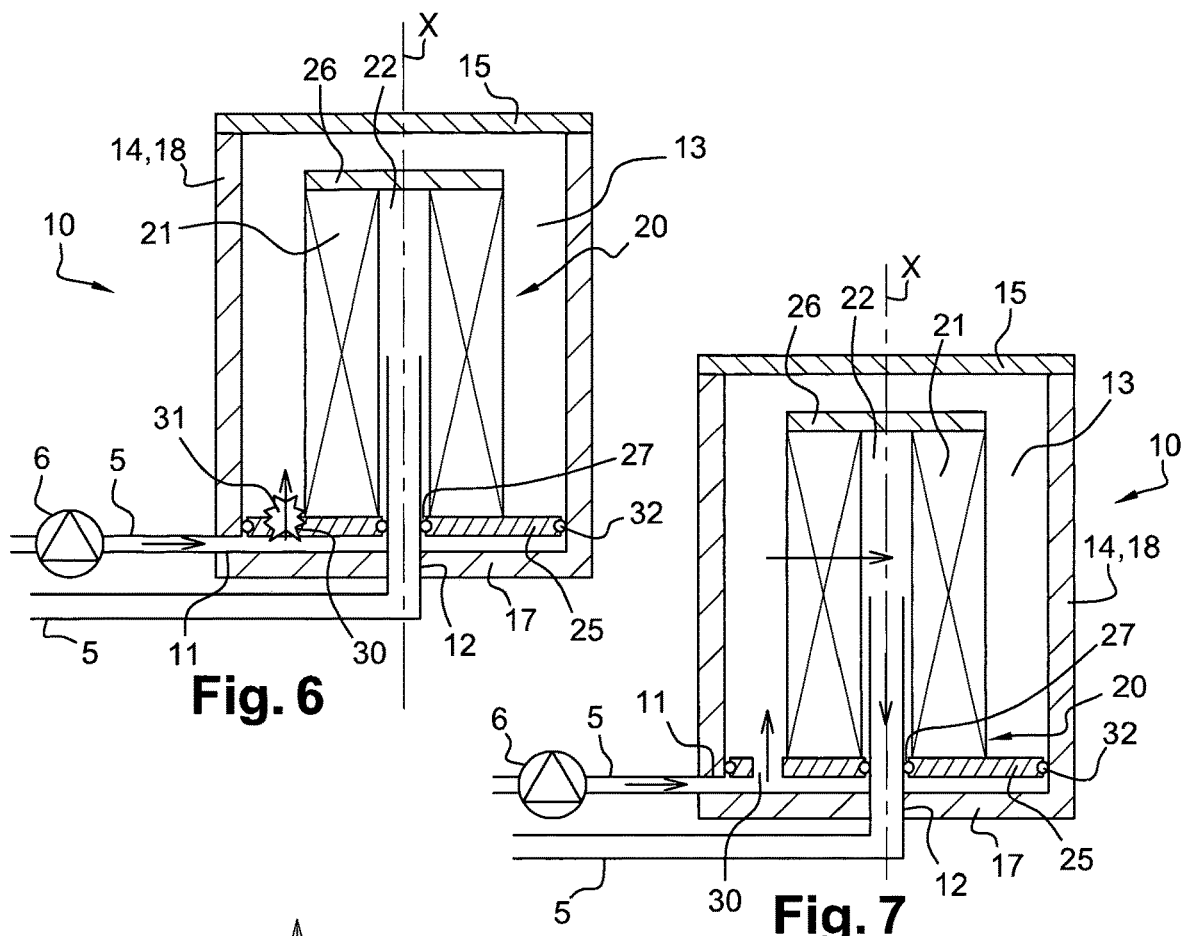
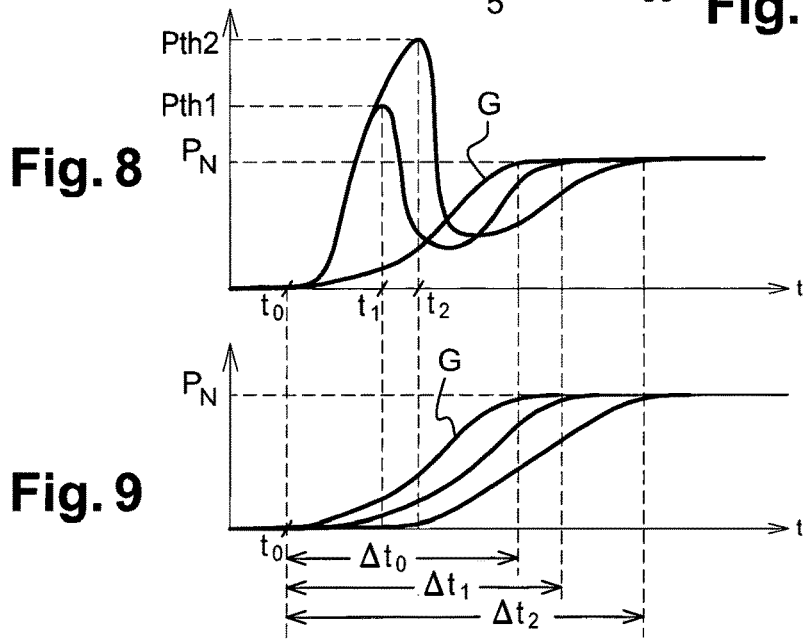
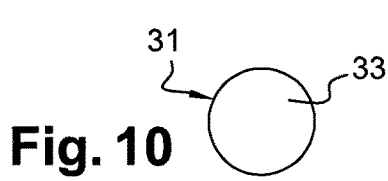 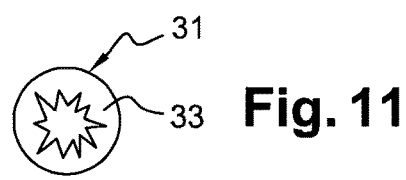

FILTER AND A METHOD FOR CHECKING THE SUITABILITY OF A FILTER ELEMENT

BACKGROUND AND SUMMARY

The invention relaxes to a filter element for filtering liquid such as fuel or oil. The invention also concerns a liquid filter arrangement comprising such a filter element, an engine arrangement including such a liquid filter arrangement, and a vehicle comprising such an engine arrangement, as well as a set of such filter elements. The invention further relates to a method for checking the suitability of a filter element in a liquid circuit and to a method for identifying to which filter element category belongs a new filter element received in a filter chamber of a liquid filter arrangement.

The invention can be applied in passenger car vehicles, medium-duty or heavy-duty vehicles, such as trucks, buses and construction equipment.

Liquid filters are commonly provided in vehicles to remove contaminants from liquid such as fuel or oil, before it is supplied to the engine.

A conventional filter element may comprise a filter medium forming an axial channel, the axial ends of said filter medium being covered by end plates sealingly mounted on said axial ends. Furthermore, one end plate includes an opening in fluid communication with the channel. Such a filter element is housed in a filter housing that is closed by a filter cover. The filter housing comprises an inlet port and an outlet port for the liquid, one of said ports being in fluid communication with said opening. Thus, the liquid to be filtered can flow inside the filter housing by the inlet, through the filter medium, and then the filtered liquid can exit the filter element by the opening and, ultimately, can exit the filter housing by the outlet.

The liquid filter arrangement—comprising the filter housing, the filter cover and the filter element—is located in a liquid circuit which includes an electrical pump and which supplies liquid to the engine.

Because the filter medium progressively gets clogged, the filter element needs to be periodically changed in a maintenance operation, so that it remains effective. To that end, the filter cover is removed from the filter housing, the old filter element is removed, and a new filter element is inserted in the filter housing before the cover filter is closed again.

A wide range of filter elements exist, which can have various characteristics such as the size, the capacity, filtration efficiency, etc . . . depending on their use, in particular on the vehicle on which they will be installed.

It is very important that the appropriate filter element in the available range be put in the filter housing of the liquid filter arrangement, in order to achieve the required filtration quality, but also to avoid damaging the filter element, and ultimately damaging the engine.

In order to avoid improper insertion of a filter element in the filter housing, or insertion of an inappropriate filter element in the filter housing, filter elements can be equipped with positioning means cooperating with the filter housing only when the position of the filter element is correct, and/or with identification means that can be recognised by the filter housing or another component.

However, these conventional solutions can be fairly expensive. Moreover, they do not allow detecting all problems that can occur. For example, they may not be capable of detecting that no filter element has been inserted in the filter housing, or that the filter element is damaged, or that the filter element has been already used.

It therefore appears that, from several standpoints, there is room for improvement in filter elements.

It is desirable to provide a technical solution for solving the above mentioned problems, in particular for ensuring an appropriate and brand new filter element has been inserted in the filter housing of a liquid liquid filter arrangement.

According to a first aspect of the invention, a filter element intended to be mounted in a liquid filter arrangement is provided and comprises:

a filter medium having a general annular shape around a central axis and forming a central channel extending substantially axially;

a first and a second end plates, each end plate covering one axial end of the filter medium and being sealingly mounted on said axial end, at least one end plate having an opening in fluid communication with the central channel;

wherein the filter element comprises at least one closing member, the closing member being configured:

to remain close below a predetermined threshold pressure to prevent a liquid flow, to open only once at said predetermined threshold pressure to allow a liquid flow, and after the closing member has been opened, to remain open.

In other words, when the closing member has been opened it remains open irrespective of the pressure that can apply on it.

More precisely, the closing member is configured when the filter element is mounted into a liquid filter arrangement:

to remain close when a liquid pressure that applies on the closing member is below the predetermined threshold pressure in order to prevent liquid from flowing through a flow path of the liquid filter arrangement, to open when the liquid pressure that applies on the closing member reaches said predetermined threshold pressure in order to allow liquid to flow through said flow path, and after the closing member has been opened, to remain open even if the liquid pressure that applies on the closing member drops below said predetermined threshold pressure.

Thus, there can be provided a range of various categories of filter elements, depending for example on their size, efficiency or capacity. Advantageously, each filter element of a given category, which is suitable for a given vehicle, is equipped with the same kind of closing member, i.e. a closing member which opens at a given pressure threshold. Furthermore, a filter element of another filter element category is equipped with another kind of closing member, i.e. a closing member which opens at another pressure threshold.

As a result, depending on the pressure at which the closing member opens or depending on the pressure at which the liquid can begin flowing through the filter element, a user can know whether said pressure is identical to the pressure at which the closing member of an appropriate filter element would open. In other words, this allows the user to know if the filter housing of the liquid filter arrangement contains an appropriate filter element. In practice, this can be checked by monitoring the pressure in the liquid circuit comprising the liquid filter arrangement, by a pressure sensor, which can be conventionally provided in said liquid circuit.

The closing member is therefore a single-use member; after it has been opened, the filter element can operate normally. It can be located in various parts of the filter element, except on the filter medium, in order not to alter it.

Preferably, the closing member is arranged into a hole of the filter element and that is preferably arranged in said flow path.

The hole equipped with the closing member can form an inlet for the liquid to be filtered. Alternatively, it could form an outlet for the filtered liquid.

The hole equipped with the closing member can be arranged on an end plate of the filter element.

In an embodiment, said hole may be located on one end plate, outside the filter medium. Preferably, said end plate comprises a sealing element on its outside periphery, for providing sealing with the inner face of the peripheral wall of a filter housing intended to receive said filter element. For example, said hole and the opening in fluid communication with the channel are distinct and arranged on one and the same end plate.

In another embodiment, said hole can be formed by the opening in fluid communication with the central channel.

The closing member may comprise a membrane designed to break when the pressure on one side of said membrane reaches said threshold.

The closing member may comprise a valve including a first element and a second element movable with respect to the first element from a closed position to an open position. The second element is in the closed position before the first use of the filter element and until the pressure reaches said threshold, and is configured to move towards its open position when the pressure reaches said threshold.

Preferably, the valve further comprises means for maintaining the second element in the open position with respect to the first element. Thanks to such means, the motion of the second element from the closed position to the open position is irreversible.

The second element can be a sealing ball and means for maintaining the sealing ball in the open position with respect to the first element, are realized by flexible or deformable legs or by a flexible or deformable collar which are or is designed to authorize motion of the sealing ball from the closed position to the open position and to prevent motion of the sealing ball from the open position to the closed position.

Advantageously, the first element is a valve body comprising an inlet and an outlet which are in fluid communication through a liquid passage formed in the valve body when the sealing ball is in the open position and in that the valve comprises, arranged in the valve body, a spring urging the sealing ball towards the closed position.

According to a second aspect, the invention relates to a liquid filter arrangement comprising:

a filter housing comprising a bottom wall, a peripheral wall, and an open axial end opposite the bottom wall a filter cover removably secured to the filter housing at its open axial end and defining with the filter housing a filter chamber;

a filter element as previously described, mounted in the filter chamber;

an inlet and an outlet being arranged in the filter housing and/or in the filter cover for the liquid to be filtered, respectively for the filtered liquid, one of the inlet and the outlet being in fluid communication with the opening in fluid communication with the channel.

According to a third aspect, the invention relates to an engine arrangement comprising an internal combustion engine and a liquid circuit for supplying liquid to the engine, the liquid circuit comprising;

an electrical pump;

a liquid filter arrangement as previously described, preferably located downstream from the pump;

a pressure sensor located inside or outside the filter chamber of the liquid filter arrangement;

an electronic control unit designed to receive the pressure data measured by the pressure sensor, and to control the electrical pump.

The electronic control unit is thus capable of monitoring the pressure in the liquid circuit, for example close to the liquid filter arrangement, and therefore to detect a rise in pressure over time, as long as the closing member is closed, and a sudden pressure drop following the opening of the closing member. Such a pressure peak is a characteristic specific to one kind of closing member, i.e. to one category of filter element. Consequently, detecting such a pressure peak allows identifying the filter element category.

The pressure sensor can be located downstream or upstream said filter element and can be located downstream or upstream from said closing member.

According to a fourth aspect, the invention relates to a vehicle comprising such an engine arrangement.

According to a fifth aspect, the invention relates to a set of filter elements as previously described, this set of filter elements comprising:

at least one filter element of a first filter element category, the or each filter element of said first filter element category being equipped with a closing member of a first kind designed to open at a first predetermined pressure threshold Pth1;

at least one filter element of a second filter element category, the or each filter element of said second filter element category being equipped with a closing member of a second kind designed to open at a second predetermined pressure threshold Pth2 different from the first predetermined pressure threshold Pth1.

According to the invention, the set of filter elements is not limited 10 two filter element categories and may comprise more than two filter element categories.

According to a sixth aspect, the invention relates to a method for checking the suitability of a filter element received in a filter chamber of a liquid filter arrangement located in a liquid circuit which includes an electrical pump, the liquid filter arrangement having an inlet port and an outlet port for the liquid. The method comprises, at first use of the liquid filter arrangement after a filter element change:

monitoring, in a first step, the liquid pressure at a point of the liquid circuit located near an inlet port or an outlet port of the liquid filter arrangement, inside or outside the filter chamber, when the electrical pump is restarted for the first time;

comparing, in a second step and when the electrical pump is restarted for the first time, at least one parameter, at least one parameter of the pressure evolution of said liquid pressure monitored over time with at least one reference value.

Preferably said reference value corresponds to said parameter of the pressure evolution of said liquid pressure monitored over time wherein said parameter is determined for a reference pressure evolution occurring with a new reference filter element.

By "a new reference filter element" is meant a filter element that is suitable for the considered application, and that has never been used. The behaviour of such a new reference filter element is known, for instance, the pressure evolution over time has been predetermined.

As the comparison of the pressure evolutions—for the filter element under test and for the new reference filter element—occurs in the same conditions, this makes it possible to determine if the filter element under test is appropriate. More specifically, if said parameter of the pressure evolution for the filter element under test has the same or substantially the same value as the same parameter for the pressure evolution for the new reference filter element, then the conclusion is that the filter element under test is suitable. Otherwise, this indicates that there is a problem.

Preferably, said parameter is the time to build-up pressure from the pump restart to the normal operating pressure when the electrical pump is restarted for the first time after filter element change and said reference value is a reference time to build-up pressure, at said point, from the pump restart to the normal operating pressure for a new reference filter element.

In other words, the method comprises comparing the time for build-up pressure from the pump restart to the normal operating pressure between said filter element and the new reference filter element.

In the present application, the expression "the normal operating pressure" refers to the pressure of the liquid in the filter chamber of the liquid filter arrangement under normal operating conditions, that is to say when a new filter element is mounted in a liquid filter arrangement and when engine has started for a while, for instance, for more than 5 minutes.

The filter medium can generate some pressure lost when crossed by the liquid to be filtered, however when the filter element is used for the first time, these pressure lost typically in a fuel filter or in an oil filter, are negligible with respect to the normal operating pressure. That's why, in the present application the normal operating pressure is considered without making a difference between the upstream side and the downstream side of the filter element.

This checking method is advantageous in that it makes it possible to detect various problems related to the filter element. The method allows detecting if the filter element pertains to the appropriate filter element category, i.e. in particular if it has the appropriate size, filtering capacity, filtering efficiency etc. Furthermore, the method according to the invention allows detecting if a filter element has been inserted in the filter housing, or if the filter housing is empty. It further allows detecting the condition of the filter element, for example if it is new or has already been clogged, if it is altered (because of a manufacturing defect, or because it has been damaged, typically if the filter medium has a hole).

As the pressure is monitored at the first pump restart after the filter element change, the pressure comparison is particularly reliable.

Another significant advantage of the method according to the invention is that it does not require any additional element in the liquid circuit to check the suitability of the filter element. Indeed, liquid circuits are conventionally provided with a pressure sensor, and therefore the invention can use this existing pressure sensor.

The method may further comprise providing a warning in case the filter element under test is detected as being not suitable. Such a warning can be a visual and/or audible indication. The method may also comprise providing a signal indicating the filter element under test is suitable.

The point where the liquid pressure is monitored can be located downstream from the filter element, or upstream from the filter element.

Advantageously, in the above method the filter element received in the filter chamber is a filter element as previously described, i.e. with a closing member.

The method may comprise a further step consisting in or comprising detecting, during the evolution of the liquid pressure monitored according to the first step, a pressure peak before the monitored liquid pressure drops and returns to a normal operating pressure.

The second step of the method may more precisely consist in or comprise comparing at least one parameter of said detected pressure peak with at least one reference value.

Preferably, the reference value corresponds to said parameter of said detected pressure peak wherein said parameter is determined for a reference pressure peak occurring with a new reference filter element that is also equipped with a closing member.

As the pressure peak is easy to detect, this ensures a highly reliable checking method.

Said parameter can be the time between the pump restart and the pressure peak (i.e. when the pressure reaches its maximum value), or the measured pressure value at the pressure peak.

According to a seventh aspect, the invention relates to a method for identifying to which filter element category belongs a new filter element received in a filter chamber of a liquid filter arrangement located in a liquid circuit which includes an electrical pump, the liquid filter arrangement having an inlet port and an outlet port for the liquid.

Said method comprises the following steps:

providing, in a step a, a set of filter elements as previously described;

receiving, in a step b, in the filter chamber a new filter element that is a filter element belonging to the first filter element category or to the second filter element category of said set of filter elements;

monitoring, in a step c1, the liquid pressure at a point of the liquid circuit located near an inlet or an outlet port of the liquid filter arrangement, inside or outside filter chamber, when the electrical pump is restarted for the first time after having received in the filter chamber the new filter element;

comparing, in a step d and when the electrical pump is restarted for the first time, at least one parameter of the pressure evolution of said liquid pressure monitored over time with reference values for said first and second filter element categories, depending on the result of the comparison performed in step d, identifying, in a step e, to which filter element category belongs the new filter element.

Preferably, said parameter is the time to build-up pressure from the pump restart to the normal operating pressure when the electrical pump is restarted for the first time after filter element change and reference values are reference time to build-up pressure, at said point, from the pump restart to the normal operating pressure for a new reference filter element of each filter element category.

The method may comprise a further step c2 consisting in or comprising detecting, during the pressure evolution of the liquid pressure monitored over time according to step c1, a pressure peak before the monitored liquid pressure drops and returns to the normal operating pressure. The step d of the method may more precisely consist in or comprise comparing, at least one parameter of said detected pressure peak with reference values for said first and second filter element categories.

Preferably, in step d, reference values corresponds to said parameter of said detected pressure peak wherein said parameter is determined for reference pressure peaks occurring with a new reference filter element of each filter element category.

For instance, said parameter can be the time between the pump restart and the pressure peak (i.e. when the pressure reaches its maximum value), or the measured pressure value at the pressure peak.

More preferably, said parameter of said detected pressure peak is the pressure value measured at the pressure peak and said reference values are the first predetermined pressure threshold and the second predetermined pressure threshold.

Preferably, in the set of filter elements previously described, filter elements belonging to different filter element categories have different filtering capacities and/or efficiencies and for each filter element category it is predetermined a specific maintenance interval that is different from one filter element category to another.

In the present application a maintenance interval is considered as being the time or the distance driven by vehicle that separates two successive maintenance operations wherein a used filter element is replaced by a new one.

Advantageously, the method comprises a further step f following step e. Step f consists in or comprises determining, depending on which filter element category the new filter element belongs, a maintenance interval, a time before the next maintenance operation or a distance that the vehicle can drive before the next maintenance operation. This information is preferably displayed to the user as a recommended maintenance interval, a recommended time before next maintenance operation or a recommended distance that the vehicle can drive before next maintenance operation.

Although the method described above provides in step a two filter element categories, the method is not limited to only two filter element categories. More than two filter element categories can be used in the above method.

A liquid filter arrangement for a vehicle may be designed to receive different filter element categories, having different efficiencies, capacities and/or size. Therefore, different filter elements categories may be suitable for a given vehicle provided that the maintenance interval is adapted to take into account filtration properties that are different from one filter element category to another. Thanks to the seventh aspect of the invention, it becomes easy to detect to which filter element category belongs a new filter element equipped with the closing member such as previously described and easy to determine, depending on the filter element category it belongs, what should be a recommended maintenance interval, a recommended time or a recommended distance that the vehicle can drive before the next maintenance operation.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 6 and 7 show the liquid filter arrangement of FIG. 5 respectively when the closing member is being opened, and when the closing member is in the open state;

FIG. 8 is a graph showing the evolution of the liquid pressure P1 over time, at a point located upstream from the closing member, as shown in FIG. 5, for various categories of filter elements;

FIG. 9 is a graph showing the evolution of the liquid pressure P2 over time, at a point located downstream from the closing member, as shown in FIG. 5, for various categories of filter elements;

FIGS. 10 and 11 show a first embodiment of a closing member, respectively before it is opened and after it has been opened; cracking membrane

DETAILED DESCRIPTION

Figure 1:
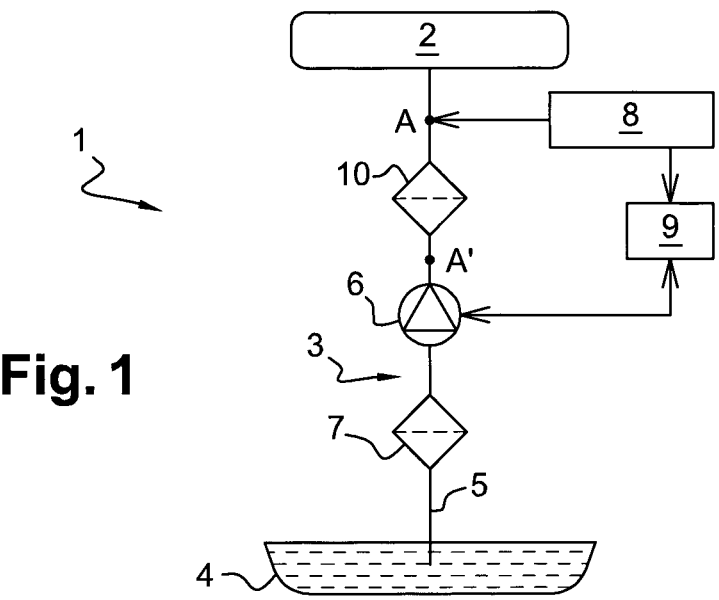
FIG. 1 is a schematic view of an engine arrangement according to the invention.

FIG. 1 shows an engine arrangement 1 comprising an internal combustion engine 2 and a liquid circuit 3 for supplying liquid to the engine 2.

The liquid circuit 3 comprises a liquid tank 4 and a pipe 5 carrying liquid to the engine 2. On the pipe 5 is located an electrical pump 6, which can be an electrical low pressure pump and a liquid filter arrangement 10 located downstream from the electrical pump 6. An additional liquid filter arrangement 7 may be provided between the liquid tank 4 and the electrical pump 6.

The liquid circuit 3 further comprises a pressure sensor 8 located outside the liquid filter arrangement 10. In the embodiment illustrated in FIG. 1 the pressure sensor 8 is located downstream from the liquid filter arrangement 10. However, other embodiments could be envisaged. Indeed, in different other embodiments, the pressure sensor can be located upstream the liquid filter arrangement and/or inside the liquid filter arrangement 10.

The liquid circuit 3 further comprises an electronic control unit 9 designed to receive the pressure data measured by the pressure sensor 8 and to control the electrical pump 6.

Figure 5:
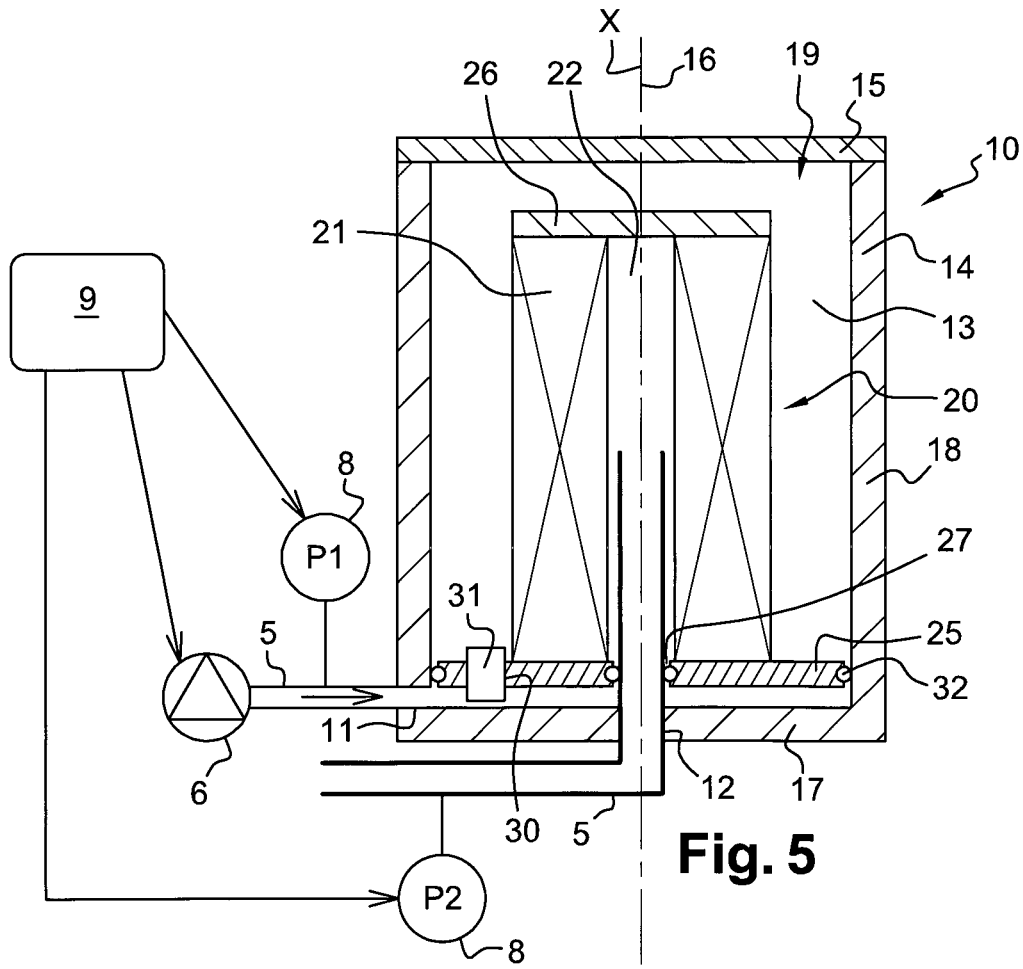
FIG. 5 shows a detail of a liquid circuit including a liquid filter arrangement according to an embodiment of the invention, comprising a filter element equipped with a closing member, said closing member being in a closed state.

As shown in FIGS. 5-7, the liquid filter arrangement 10 comprises a filter housing 14 and a filter cover 15. The filter housing 14 and the filter cover 15 define a filter chamber 13. The filter housing 14, which is generally cylindrical, has an axis 16 and comprises a bottom wall 17, a peripheral wall 18, and an open axial end 19 opposite the bottom wall 17. The filter cover 15 is removably secured to the filter housing 14 at its open axial end 19. For example, the filter cover 15 comprises a disc-like plate and a skirt provided with an external thread for cooperation with an internal thread of the peripheral wall 18 of the housing 14. Two ports 11, 12 are arranged in the liquid filter arrangement, for instance, in the filter housing 14, one port being an inlet for the liquid to be filtered, the other one being an outlet for the filtered liquid. A portion of the pipe 5 is sealingly mounted in fluid communication with each of the ports 11, 12 for carrying the liquid to be filtered/once filtered.

The liquid filter arrangement 10 also comprises a filter element 20 mounted in the filter chamber 13, substantially coaxially. The filter element 20 comprises a filter medium 21 forming a channel 22 extending along a central axis X and having a general annular cross-section around the central axis X. The filter medium 21 can be made of a sheet of cellulosic material or synthetic material folded so as to have, in cross section, the shape of a star having a plurality of branches. A rigid perforated central lube (not shown) provided with holes can be arranged in the channel 22 to prevent the filter medium 21 from flattening due to the liquid flow through it.

The filter element 20 further comprises a first and a second end plates 25, 26, each end plate covering one axial end of the filter medium 21 and being sealingly mounted on said axial end. The first end plate 25 has an opening 27 in fluid communication with the channel 22. Typically, the opening 27 can be coaxial with the channel 22. When the filter element 20 is mounted in the filter chamber 13, the opening 27 is further in fluid communication with one of the inlet 11 and outlet 12 of the filter housing 14. In the embodiment of FIG. 5, the opening 27 is in fluid communication with the outlet 12.

In use, a liquid to be filtered flows from the inlet 11 of the filter housing 14 through the filter medium 21, for example from the outside of the filter medium 21 towards the channel 22, and then out of the filter element 20 through the opening 27, and ultimately out of the liquid filter arrangement 10 through the outlet 12. Alternatively, the liquid to be filtered can flow reversely, i.e. from the channel 22 towards the outside of the filter medium 21.

As the end plates 25, 26 are sealingly mounted on the filter medium 21, the inside and the outside of the filter medium 21 are not in fluid communication, except through the filter medium 21.

When the filter medium 21 has become clogged, the filter element 20 is removed from the filter housing 14 during a maintenance operation and a new filter element 20 is inserted in the filter housing 14.

It is of paramount importance that the inserted filter element 20 be appropriate, i.e. have the required properties for its intended use.

The filter element 20 is chosen among a set of filter elements which pertain to various categories depending in particular on its size, on its capacity and/or on its efficiency which may depend on the filter medium constituent material, on the number of folds in the filter medium 21, etc . . . .

It is also of paramount importance to ensure that a filter element 20 has been inserted in the filter housing 14, and that this filter element, in addition to pertaining to the appropriate category, has not been altered (i.e. has no manufacturing defect, is not at least partially clogged, has not been damaged, etc.).

The invention provides a method for checking the suitability of a filter element 20 received in the filter housing 14 of the liquid filter arrangement 10, after a filter element change.

The method is carried out at first use of the liquid filter arrangement 10 after a filter element 20 change, when the electrical pump 6 is restarted for the first time. The liquid pressure at a point A of the liquid circuit 3 located near a port of the filter housing 14, inside or outside the filter housing 14, is measured and monitored over time, by the pressure sensor 8 and the electronic control unit 9.

A pump 6 of the electrical type is advantageously used in the method according to the invention because it can be operated regardless the operating state of the engine and regardless the engine speed.

Moreover, the evolution of said monitored liquid pressure overtime is compared with a predetermined evolution over time of the liquid pressure at said point A for a new reference filter element, at first use of the new reference filtering filter element after a filter element change, when the electrical pump 6 is restarted for the first time. Indeed, as shown in FIGS. 2a-2c, the graph showing the evolution of liquid pressure over time, at a predetermined point of the liquid circuit 3, can be predetermined for a new reference filter element of a given filter element category, i.e. a filter element which has never been used, which has no defects, and which has predetermined characteristics (size, capacity, efficiency, etc . . . ).

Figure 2A:
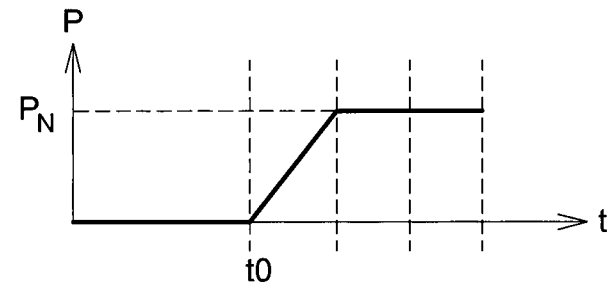
FIG. 2a-2c are graphs showing the evolution of liquid pressure over time, for three filter elements of various categories.
Figure 2B:
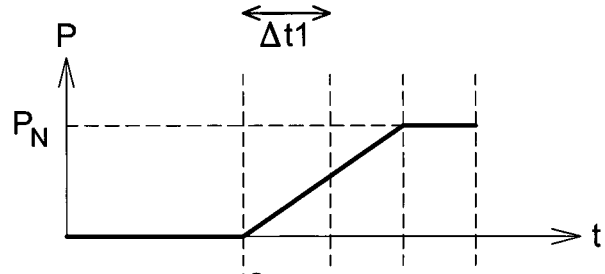
Figure 2C:
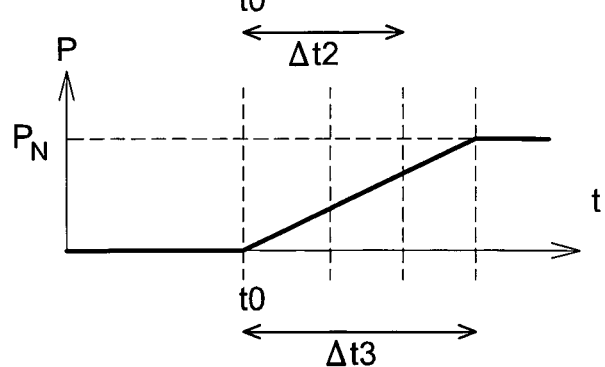

As shown in FIGS. 2a-2c, the typical pressure evolution from the pump first restart at t0 is a pressure increase, for example substantially linearly, until the pressure reaches the normal operating pressure PN. Moreover, the time for build-up pressure from the pump restart to the normal operating pressure depends on the filter element type. More specifically, when point A is located downstream from the filter element 10, the time for build-up pressure $\Delta t$ is $\Delta t1$ for a filter element 20 having a small size, $\Delta t2 > \Delta t1$ for a filter element 20 having a medium size, and $\Delta t3 > \Delta t2$ for a filter element 20 having a large size.

As a consequence, comparing the pressure evolution of the filter element 20 under test with the pressure evolution of a new reference filter element makes it possible to detect:
    if a filter element is present;
    if the filter element under test is of the appropriate type (size, capacity, efficiency . . . );
    if the filter element under test is new and intact.

Figure 3A:
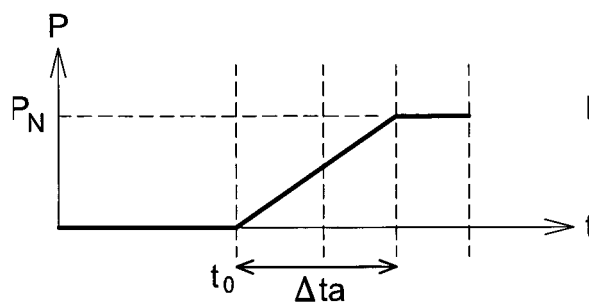
FIG. 3a-3b are graphs showing the evolution of liquid pressure over time, respectively for a liquid filter arrangement receiving a new reference filter element and for a liquid filter arrangement receiving no filter element.

For example, if the pressure evolution over time of a new reference filter element is the one shown in FIG. 3a, and if the pressure evolution of the filter element under test is the one shown in FIG. 3b—i.e. the time to build-up pressure $\Delta tb$ from the pump restart t0 to the normal operating pressure PN is lower than a reference time to build up pressure $\Delta ta$—then the method according to the invention enables a user to know the filter element which has been inserted in the filter housing is unsuitable. In this case, the filter element may have a smaller capacity, or may even be absent.

Figure 4A:
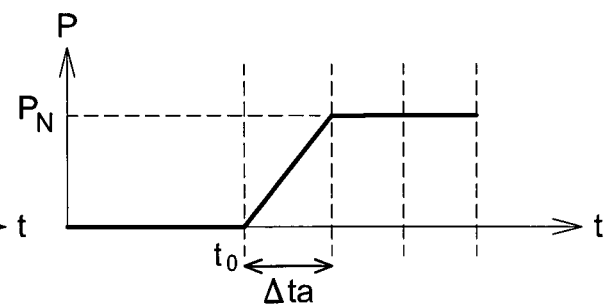
FIG. 4a-4b are graphs showing the evolution of liquid pressure over time, respectively for a new reference filter element and for an unsuitable filter element.
Figure 3B:
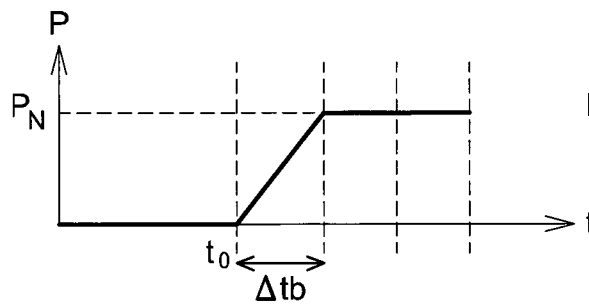
Figure 4B:
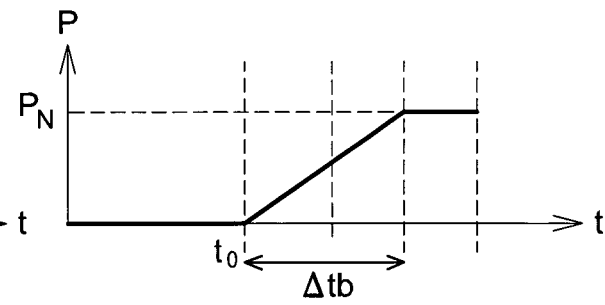

Another example is shown in FIGS. 4a and 4b. If the pressure evolution over time of a new reference filter element is the one shown in FIG. 4a, and if the pressure evolution of the filter element under test is the one shown in FIG. 4b—i.e. the time to build-up pressure $\Delta tb$ from the pump restart t0 to the normal operating pressure PN is higher than a reference time time to build up pressure $\Delta ta$—then the method according to the invention enables a user to know the filter element which has been inserted in the filter housing is unsuitable. In this case, the filter element may have a higher capacity.

The method as described above can be carried out with a filter element as previously described.

The method may comprise comparing other parameters on the pressure evolution graph.

For example, the method can comprise using a specific filter element 20, as illustrated in FIGS. 5-7. Such a filter element includes a closing member 31. The closing member 31 is configured to prevent liquid from flowing through a flow path of the liquid filter arrangement 10 when the liquid pressure upstream the closing member 31 is below a predetermined threshold Pth. The closing member 31 is then in a closed state, as illustrated in FIG. 5. The closing member 31 is in this closed stale before its first use, and during its first use until said pressure reaches the predetermined threshold Pth.

The flow path can be formed by at least the inlet 11, the dirty side of the filter chamber 13 that is to say the zone of the filter chamber that is located upstream from the filter medium 21, the central channel 22, the opening 27 and the outlet 12.

Besides, when the liquid pressure upstream the closing member 31 reaches the predetermined threshold Pth, the closing member 31 is also configured to open, as illustrated in FIG. 6, and therefore allows liquid to flow through said flow path, as illustrated in FIG. 7.

Finally, the closing member 31 remains open after it has been opened even if the liquid pressure that applies on the closing member 31 drops below said predetermined threshold pressure Pth.

The filter element can also include a hole 30 that is arranged in the flow path. In the illustrated embodiment, the hole 30 is preferably equipped with the closing member 31 and is arranged on the first end plate 25, outside the filter medium 21. Furthermore, the first end plate 25 may comprise a sealing element 32 on its periphery, for providing sealing with the inner face of the peripheral wall 18 of the housing 14. In this exemplary embodiment, the hole 30 forms an inlet for the liquid to be filtered.

Other implementation could however be envisaged, provided the hole 30 is arranged on the flow path of the liquid inside the filter housing 14. The hole 30 can be, for instance, arranged on the second end plate 26 of the filter element 20.

FIGS. 8 and 9 show the typical pressure evolution over time, for new reference filter elements of two different filter element categories. A first new reference filter element that belongs to a first filter element category and that is equipped with a closing member 31 of a first kind that is designed to open at a first predetermined pressure threshold Pth1. A second new reference filter element that belongs to a second filter element category and that is equipped with a closing member 31 of a second kind that is designed to open at a second predetermined pressure threshold Pth2.

FIG. 8 shows the evolution of pressure P1, upstream from the closing member 31, for instance, at a point A' between the liquid filter arrangement 10 and the electrical pump 6 (see FIG. 1). FIG. 9 shows the evolution of pressure P2, downstream from the closing member 31, for instance, a point A (see FIG. 1) downstream from the liquid filter arrangement 10.

The typical evolution of P1 from the pump first restart at t0 is a pressure increase, until the pressure reaches the predetermined threshold Pth causing the closing member 31 to open. The pressure peak Pth is obtained at time t, and then P1 decreases and then returns the normal operating pressure PN. Pressure P1 then remains substantially constant.

The parameters of the pressure peak, in particular the values of Pth and t, depend on the filter element type, and among other characteristics on the kind of the closing member 31.

FIG. 8 shows two graphs for two different kinds of closing members 31, leading to two different pressure peaks, namely: t1, Pth1; and t2, Pth2. FIG. 8 also shows a graph G obtained with an altered filter element, i.e. for example a filter element having an open closing member. It clearly appears that a used filter element can be easily detected by this method, as graph G is devoid of any pressure peak. This method further makes it possible to know if the filter element under test is the appropriate one, by detecting a pressure peak and comparing at least one parameter Pth or t of the detected pressure peak with at least reference value t1, Pth1; t2 or Pth2. The reference value preferably corresponds to said parameter Pth, t of said detected pressure peak wherein said parameter is determined for a reference pressure peak occurring with a new reference filter element equipped with a closing member. For instance, if for a given vehicle the suitable filter element category is determined as being the first one and if said parameter of the detected pressure peak is, for instance, the maximum pressure value Pth, said reference value will be the maximum pressure value Pth1 of the pressure peak that is reached with the first new reference filter element. If Pth matches or corresponds to Pth1 that means than the tested filter element belongs to the suitable filter element category, i.e. the first filter element category.

By comparison with a new filter element that doesn't use a closing member 31, a filter element equipped with the closing member 31 according to the invention, will also delay at a first restart of the pump after filter element change the time it to build up pressure from the pump restart t0 to the normal operating pressure PN. Such as represented on FIGS. 8 and 9, each different pressure peak Pth1, Pth2 will also affect differently Δt1, Δt2 the time Δt to build up pressure from the pump restart t0 to the normal operating pressure PN.

FIG. 9 also shows two graphs for two different lands of closing members 31, resulting from two different pressure peaks, namely: t1, Pth1; and t2, Pth2. FIG. 9 also shows a graph G obtained with an altered filter element, i.e. for example a filter element having an open closing member. As can be seen on FIG. 9 the pressure peaks can be difficult to detect when pressure is monitored downstream from the closing member 31. However it clearly appears that a used filter element can be easily detected by this method. This method further makes it possible to know if the filter element under test is the appropriate one, by comparing the mesured time Δt to build up pressure from the pump restart t0 to the normal operating pressure PN, with a reference time Δt1, Δt2 to build-up pressure from the pump restart to the normal operating pressure for a new reference filter element. Δt1 is a reference time for the first filter element category and Δt2 is a reference time for the second filter element category. The time Δt1, Δt2 are sufficiently different to allow identifying if the filter element belongs to the suitable filter element category. For instance, if for a given vehicle the suitable filter element category is determined as being the first one and if the measured time Δt, doesn't match or doesn't correspond to the reference time Δt1 that means that the filter element that has been inserted in the filter housing 14 doesn't belong to the suitable filter element category, i.e. the first filter element category.

Checking the suitability of a filter element by the detection of a pressure peak is particularly reliable.

A method according to the invention can also be carry out to identify, among different filer element categories, to which filter element category a new filter element 20 belongs and to adjust the maintenance interval between two successive maintenance operations depending on which filter element category the new filter element is identified to belong.

By maintenance operation it is understood in the present description an operation that comprises the replacement of a used filter element by a new one.

To this aim a specific method according to the invention can comprise the following steps:

providing, in a step a, a set of filter elements 20 comprising:

at least one filter element of a first filter element category, each filter element of said first filter element category being equipped with a closing member 31 of a first kind designed to open at a first predetermined pressure threshold Pth1, at least one filter element of a second filter element category, the or each filter element of said second filter element category being equipped with a closing member 31 of a second kind designed to open at a second predetermined pressure threshold Pth2 different from the first predetermined pressure threshold Pth1, receiving, in a step b, in the filter chamber 13 a new filter element 20 belonging to said first filter element category or to said second filter element category;

monitoring, in a step c1, the liquid pressure at a point of the liquid circuit located near an inlet 11 or an outlet port 12 of the liquid filter arrangement 10, inside or outside filter chamber 13, when the electrical pump 6 is restarted for the first time after having received in the filter chamber 13 the new filter element 20, comparing, in a step d and when the electrical pump 6 is restarted for the first time, at least one parameter Pth, t and or $\Delta t$ of said liquid pressure monitored over time with reference values Pth1, t1, $\Delta t1$, Pth2, t2, and/or $\Delta t2$ for said first and second filter element categories, depending on the result of the comparison performed in step d, identifying, in a step e, to which filter element category belongs the new filter element.

For instance, if said parameter (Pth, t and/or $\Delta t$) matches with reference value determined for said first filter element category, it is identified that the new filter element belongs to the first filter element category.

Although the method described above mentions in step a two filter element categories, the method is not limited to only two filter element categories. More than two filter element categories can be used in the above method.

Said parameter Pth, t, $\Delta t$ can be the measured time $\Delta t$ to build-up pressure from the pump restart 10 to the normal operating pressure PN when the electrical pump 6 is restarted for the first time after filter element change and reference values are reference time $\Delta t1$, $\Delta t2$ to build-up pressure, at said point A, A', from the pump restart t0 to the normal operating pressure PN for a new reference filter element of each filter element category.

For instance, if the measured time $\Delta t$ matches or corresponds to the reference time $\Delta t1$, determined for said first filter element category, it is identified that the new filter element belongs to the first filter element category.

Preferably, the method further comprises a step c2 consisting in or comprising detecting, during the evolution of the liquid pressure monitored over time according to step c1, a pressure peak before the monitored liquid pressure drops and returns to the normal operating pressure PN and in that the step d consists, preferably, in or comprises comparing at least one parameter Pth, t of said detected pressure peak with reference values (Pth1, t1, Pth2, t2) for said first and second filter element categories.

Preferably, the reference values correspond to said parameter Pth, t of said detected pressure peak wherein said parameter is determined for reference pressure peaks occurring with a new reference filter of each filter element category.

Said parameter can be the pressure value Pth measured at the pressure peak. Preferably, said references values are the first predetermined pressure threshold Pth1 and the second predetermined pressure threshold Pth2 predetermined for each filter element category. In a variant, said parameter can be the time t between the pump restart t0 and the pressure peak.

Preferably, in the set of filter elements previously described, filter elements belonging to different filter element categories have different filtering capacities and/or efficiencies and for each filter element category it is predetermined a specific maintenance interval that is different from one filter element category to another.

Advantageously, in a further step f, following step e, it is determined, depending on which filter element category the new filter element 20 belongs, a maintenance interval, a time before the next maintenance operation or a distance that the vehicle can drive before the next maintenance operation.

The maintenance interval, the time before the next maintenance operation or the distance that the vehicle can drive before the next maintenance operation can be displayed to user as a recommendation.

According to an embodiment, the closing member 31 can comprise a membrane 33 which is initially intact, as shown in FIG. 10, and which is designed to break, or burst, when the pressure on one side of the membrane 33 reaches a threshold Pth. Depending on the constituent material of the membrane 33, on its thickness, or other parameters, the value of the threshold Pth can be different.

Figure 12:
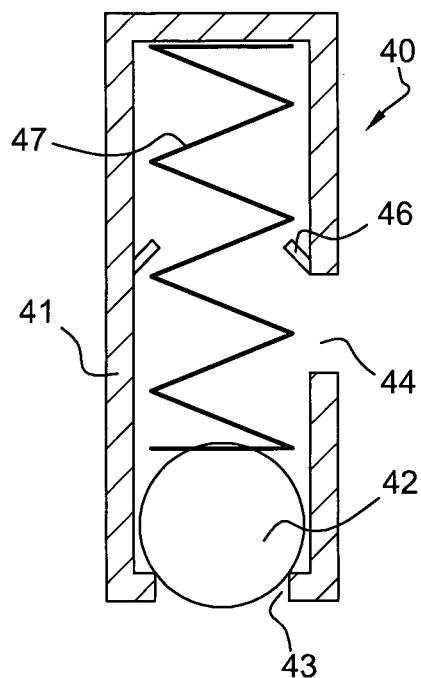
FIG. 12-15 show a second embodiment of a closing member, respectively before it is opened, during its opening, and after it has been opened.
Figure 13:
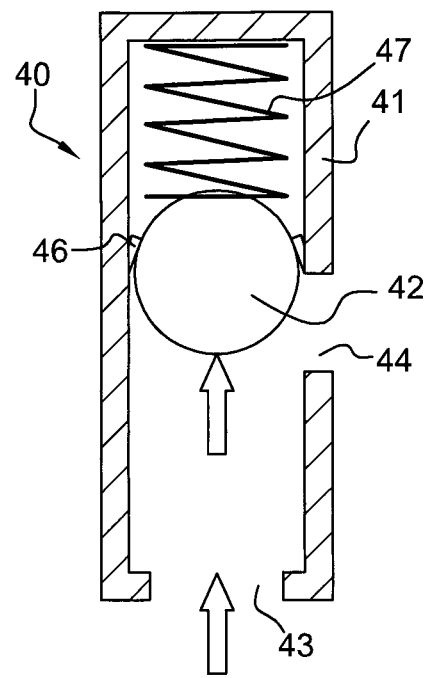
Figure 14:
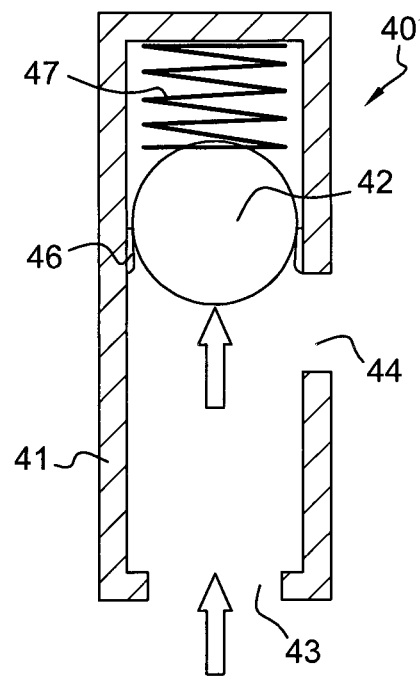
Figure 15:
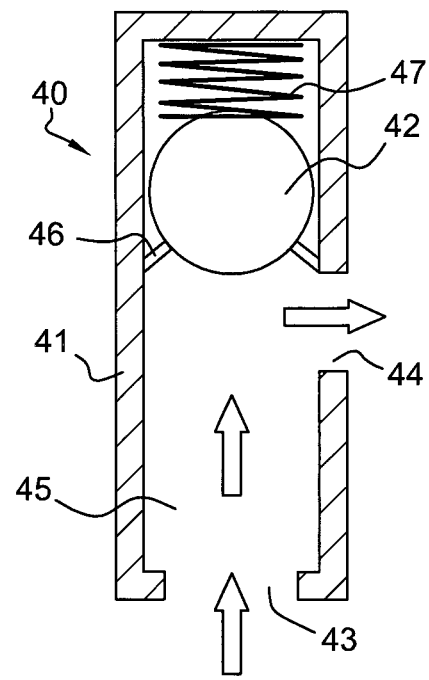

According to another embodiment, the closing member 31 can comprise a valve 40, as shown in FIGS. 12-15. The valve may include a first element 41 and a second element 42 movable with respect to the first element 41 from a closed position to an open position. The second element 42 is in the closed position before the first use of the filter element 20 (FIG. 12). When the filter element 20 used, that is to say when the electrical pump 6 is energized, the second element 42 may remain in the closed position until the pressure reaches a threshold Pth. When the threshold pressure is reached, it can progressively move apart from the first element 41 (FIGS. 13 and 14) towards its open position, (FIG. 15). The second element 42 then remains in the open position (FIG. 15) with respect to the first element 41. Means can be provided to maintain the second element 42 in its open position. Therefore, the motion of the second element 42 from the closed position to the open position is irreversible. Because the valve 40 opens only once, the valve 40 is also called in the present application as a single opening valve.

Such as represented, for instance, on FIG. 12, the second element 42 can be a sealing ball and means 46 for maintaining the sealing ball 42 in the open position with respect to the first element 41 can be, for instance, realized by flexible or deformable legs which are designed to authorize motion of the sealing ball 42 from the closed position to the open position and to prevent motion of the sealing ball 42 from the open position to the closed position.

In a variant, means 46 for maintaining the the sealing ball 42 in the open position with respect to the first element 41 can be realized by a flexible or deformable collar designed to authorize motion of the sealing ball from the closed position to the open position and to prevent motion of the sealing ball from the open position to the closed position.

The first element 41 can be realized by a valve body comprising an inlet 43 and an outlet 44 which are in liquid communication through a liquid passage 45 (see FIG. 15) formed into the the valve body 41 when the sealing ball 42 is in the open position. The valve preferably comprises, arranged in the valve body 41, a spring 47 urging the sealing ball 42 towards the closed position.

It is to be understood that the present invention is not limited to the embodiments described above and illustrated in the drawings; rather, the skilled person will recognize that many changes and modifications may be made within the scope of the appended claims.

The invention claimed is:

1. A filter element intended to be mounted in a liquid filter arrangement comprising:

a filter medium having a general annular shape around a central axis and forming a central channel extending substantially axially;

a first end plate and a second end plate, each end plate covering one axial end of the filter medium and being sealingly mounted on the axial end, at least one of the first end plate and the second end plate having an opening in fluid communication with the central channel;

at least one closing member, the closing member being configured when the filter element is mounted into the liquid filter arrangement:

to remain closed when a liquid pressure that applies on the closing member is below a predetermined threshold pressure in order to prevent a liquid flow through a flow path of the liquid filter arrangement, the flow path being formed through at least the filter medium, to open only once when the liquid pressure that applies on the closing member reaches the predetermined threshold pressure in order to allow a liquid flow through the flow path, and after the closing member has been opened, to remain open, even if the liquid pressure that applies on the closing member drops below the predetermined threshold pressure.

2. The filter element according to claim 1, wherein the closing member is arranged into a hole that is part of the filter element.

3. The filter element according to claim 2, wherein the hole is arranged in the flow path.

4. The filter element according to claim 2, wherein the hole equipped with the closing member is arranged on the first end plate or the second end plate of the filter element.

5. The filter element according to claim 2, wherein the hole equipped with the closing member forms an inlet for the liquid to be filtered.

6. The filter element according to claim 2, wherein the hole equipped with the closing member is located on the first end plate or the second end plate, outside the filter medium.

7. The filter element according to claim 6, wherein the one of the first end plate and the second end plate on which is located the hole equipped with the closing member comprises a sealing element on its outside periphery, for providing sealing with an inner face of a peripheral wall of a filter housing intended to receive the filter element.

8. The filter element according to claim 2, wherein the hole equipped with the closing member and the opening in fluid communication with the central channel are distinct and are both arranged on the first end plate or the second end plate.

9. The filter element according to claim 2, wherein the hole equipped with the closing member is formed by the opening in fluid communication with the central channel.

10. The filter element according to claim 1, wherein the closing member comprises a membrane designed to break when the liquid pressure on one side of the membrane reaches the predetermined threshold pressure.

11. The filter element according to claim 1, wherein the closing member comprises a valve including a first element and a second element movable with respect to the first element from a closed position to an open position, the second element being in the closed position before the first use of the filter element and until the liquid pressure reaches the predetermined threshold pressure, and the second element being configured to move towards the open position when the liquid pressure reaches the predetermined threshold pressure.

12. The filter element according to claim 11, wherein the motion of the second element from the closed position to the open position is irreversible.

13. The filter element according to claim 11, wherein the valve further comprises means for maintaining the second element in the open position with respect to the first element.

14. The filter element according to claim 13, wherein the second element is a sealing ball and means for maintaining the sealing ball in the open position with respect to the first element, are realized by flexible or deformable legs or by a flexible or deformable collar which are or is designed to authorize motion of the sealing ball from the closed position to the open position and to prevent motion of the sealing ball from the open position to the closed position.

15. The filter element according to claim 14, wherein the first element is a valve body comprising an inlet and an outlet which are in fluid communication through a liquid passage formed in the valve body when the sealing ball is in the open position and in that the valve comprises, arranged in the valve body, a spring urging the sealing ball towards the closed position.

16. The liquid filter arrangement comprising:
a filter housing comprising a bottom wall, a peripheral wall, and an open axial end opposite the bottom wall;
a filter cover removably secured to the filter housing at the open axial end and defining with the filter housing a filter chamber;
a filter element according to claim 1 that is mounted in the filter chamber;
an inlet and an outlet being arranged in the filter housing and/or in the filter cover for the liquid to be filtered and, respectively for the filtered liquid, one of the inlet and the outlet being in fluid communication with the opening in fluid communication with the central channel;
the flow path being formed by at least the inlet, a zone of the filter chamber located upstream from the filter medium, the filter medium, the central channel, the opening and the outlet.

17. An engine arrangement comprising an internal combustion engine and a liquid circuit for supplying liquid to the engine, the liquid circuit comprising:
an electrical pump;
the liquid filter arrangement according to claim 16, located downstream from the pump;
a pressure sensor located inside or outside the filter chamber designed to measure pressure data;
an electronic control unit designed to receive the pressure data measured by the pressure sensor, and to control the electrical pump.

18. A vehicle comprising the engine arrangement according to claim 17.

19. A set of filter elements according to claim 1, comprising:
at least one filter element of a first filter element category, the or each filter element of the first filter element category being equipped with a closing member of a first kind designed to open at a first predetermined pressure threshold;
at least one filter element of a second filter element category, the or each filter element of the second filter element category being equipped with a closing member of a second kind designed to open at a second predetermined pressure threshold different from the first predetermined pressure threshold.

* * * * *